(12) United States Patent
Grover

(10) Patent No.: US 10,945,426 B2
(45) Date of Patent: Mar. 16, 2021

(54) SNARE TRAP

(71) Applicant: Corey Grover, Consort (CA)

(72) Inventor: Corey Grover, Consort (CA)

( * ) Notice: Subject to any disclaimer, the term of this patent is extended or adjusted under 35 U.S.C. 154(b) by 219 days.

(21) Appl. No.: 16/126,088

(22) Filed: Sep. 10, 2018

(65) Prior Publication Data
US 2019/0104726 A1 Apr. 11, 2019

(30) Foreign Application Priority Data

Oct. 5, 2017 (CA) ...................................... 2981534

(51) Int. Cl.
A01M 23/34 (2006.01)
A01M 23/24 (2006.01)

(52) U.S. Cl.
CPC .......... A01M 23/34 (2013.01); A01M 23/245 (2013.01)

(58) Field of Classification Search
CPC ..... A01M 23/34; A01M 23/245; A01M 23/24
USPC ........................................................... 43/87
See application file for complete search history.

(56) References Cited

U.S. PATENT DOCUMENTS

| | | | | |
|---|---|---|---|---|
| 831,037 A * | 9/1906 | Campbell | ........... | A01M 23/245 43/96 |
| 866,862 A * | 9/1907 | Hooker | ................. | A01M 23/24 43/85 |
| 1,002,925 A * | 9/1911 | McDaniel | ............. | A01M 23/24 43/85 |
| 1,311,736 A * | 7/1919 | Woosley | ............. | A01M 23/245 43/96 |
| 1,476,529 A * | 12/1923 | Lutz | ....................... | A01M 23/24 43/91 |
| 1,620,777 A * | 3/1927 | Nerby | .................... | A01M 23/24 43/85 |
| 1,671,414 A * | 5/1928 | Durand | .................. | A01M 23/34 403/211 |
| 1,738,907 A * | 12/1929 | Kleffman | .............. | A01M 23/34 43/87 |
| 1,800,095 A * | 4/1931 | Nakagawa | ............ | A01M 23/34 43/87 |

(Continued)

OTHER PUBLICATIONS

Providence of Alberta Canada, 2014-2015 Alberta Guide to Trapping Regulations. p. 22, 2014-2015, Alberta Government, ISBN 978-1-4601-1900-6.

(Continued)

Primary Examiner — Magdalena Topolski
Assistant Examiner — Shada Mohamed Alghailani
(74) Attorney, Agent, or Firm — Davis & Bujold PLLC; Michael J. Bujold

(57) ABSTRACT

A snare trap has a cable, a spring and a trigger. A traveling loop slidingly engages the cable and creates a snare loop. A locking mechanism locks the snare loop onto the cable. The spring has a first arm and a second arm. The first arm and the second arm are biased towards an open orientation such that the spring in the open position appears sprung. The ends of the first arm and the second arm slidingly engage the cable. The trigger is movable between a set position in which the trigger tip contacts the second arm of the spring and holds the spring in a closed position such that the first arm and the second arm are tensioned towards each other and an unset position in which the trigger tip does not contact the second arm of the spring.

11 Claims, 3 Drawing Sheets

(56) References Cited

U.S. PATENT DOCUMENTS

| | | | | |
|---|---|---|---|---|
| 1,830,675 | A * | 11/1931 | Raymond | A01M 23/24 43/90 |
| 2,590,489 | A * | 3/1952 | Bailey | A01M 23/24 43/86 |
| 3,060,623 | A | 10/1962 | Aldrich | |
| 3,109,254 | A | 11/1963 | Woodward | |
| 3,276,159 | A * | 10/1966 | Robards | A01K 91/10 43/15 |
| 4,069,612 | A | 1/1978 | King | |
| 4,118,885 | A * | 10/1978 | Carter | A01M 23/245 43/97 |
| 4,171,589 | A * | 10/1979 | Brownlie | A01M 23/34 43/87 |
| 4,279,093 | A * | 7/1981 | Iddings | A01M 23/24 43/81.5 |
| 4,393,617 | A * | 7/1983 | Charnoske | A01M 23/245 43/100 |
| 4,471,559 | A | 9/1984 | Thébeau | |
| 4,581,843 | A * | 4/1986 | Fremont | A01M 23/34 43/87 |
| 4,581,844 | A | 4/1986 | Torkko | |
| 4,751,790 | A * | 6/1988 | Thomas | A01M 23/34 43/85 |
| 4,757,639 | A * | 7/1988 | Bertram | A01M 23/34 43/85 |
| 4,766,694 | A * | 8/1988 | Buckley | A01M 23/245 177/25.19 |
| 4,920,690 | A * | 5/1990 | Olecko | A01M 23/34 43/87 |
| 5,010,682 | A * | 4/1991 | Saccon | A01M 23/24 43/77 |
| 5,157,863 | A * | 10/1992 | Godwin | A01M 23/34 43/85 |
| 5,515,642 | A * | 5/1996 | Rydgerg | A01M 23/24 43/77 |
| 5,675,928 | A * | 10/1997 | Tattrie | A01M 23/34 43/15 |
| 5,907,922 | A | 6/1999 | Belisle | |
| 6,032,405 | A * | 3/2000 | Rose | A01M 23/34 43/87 |
| 6,732,472 | B1 * | 5/2004 | Matlock | A01M 23/30 43/81 |
| 8,079,174 | B1 * | 12/2011 | Turman | A01M 23/34 43/87 |
| 2008/0083155 | A1 * | 4/2008 | Waybright | A01M 23/34 43/87 |
| 2012/0266518 | A1 * | 10/2012 | Hoggan | A01M 23/34 43/87 |
| 2015/0196020 | A1 * | 7/2015 | Love | B66F 15/00 254/131 |

OTHER PUBLICATIONS

Canadian Coyote Company Ltd., 2016-2017.
Trapper Gord Trading Post mail order catalog, pp. 42, 44, 45, 2013.

* cited by examiner

SNARE TRAP

FIELD OF THE DISCLOSURE

The present application relates generally to an animal trap and more specifically relates to a snare trap.

BACKGROUND

This section provides background information to facilitate a better understanding of the various aspects of the invention. It should be understood that the statements in this section of this document are to be read in this light, and not as admissions of prior art.

Snare traps are often used as a humane way of trapping small animals. When used properly, a trap that is triggered will quickly and efficiently tighten around the animal's neck. Unfortunately, not all triggers are set off at appropriate times and the design of the triggers can make it difficult to set and can cause the spring to be over compressed and lose its strength. Conventional triggers also run the risk of snagging on the cable of snare which can cause either early or late triggering.

BRIEF SUMMARY

There is provided a snare trap that has a cable, a spring and a trigger. The cable has a tether end and a snare end. The tether end has a stop and the snare end has a tether attachment to which a tether may be attached for holding the cable in position. A travelling loop slidingly engages the cable. The travelling loop has a first aperture and a second aperture through which the cable may pass to create a snare loop. The first aperture of the travelling loop has a locking mechanism to lock the first aperture onto the cable. The spring has a first arm and a second arm. The first arm and the second arm are biased towards an open orientation such that the spring in the open position appears sprung. The ends of the first arm and the second arm slidingly engage on the cable. The trigger has a connection end and a trigger tip. The connection end slidingly engages the first arm of the spring. The trigger is movable between a set position in which the trigger tip contacts the second arm of the spring and holds the spring in a closed position such that the first arm and the second arm are tensioned towards each other and an unset position in which the trigger tip does not contact the second arm of the spring. Movement to the unset position occurs when the snare loop is pulled causing a pull on the snare end of the cable. This causes the spring to be compressed such that the trigger tip is moved out of contact of the second arm. Movement from the set position to the unset position causes tightening of the snare loop.

In one embodiment, the first aperture of the travelling loop is a cam-lock. The cam-lock acts as a locking mechanism to lock onto the cable.

In one embodiment, a washer slidingly engages the cable between the end of the second arm of the spring and the second aperture of the travelling loop. The washer is designed to prevent the second aperture of the travelling loop from interfering with the spring. The washer may also assist with compression of the spring when the trap is in the process of being sprung. The washer contacts the second arm of the spring and can assist in compression of the spring with the stop of the snare end of the cable. This causes the trigger to be released and the snare loop to tighten.

In one embodiment, a tether, such as a stake, is provided for holding the snare trap in position.

In one embodiment, a collar support is as a means of anchoring the cable at a point between the tether end of the cable and the snare loop.

In one embodiment, the second aperture of the travelling loop is a breakaway device that releases the cable at a predetermined pressure. When breakaway device releases the cable, the snare loop is released and anything in the snare loop is released from the snare trap.

There is also provided a snare trap. The snare trap has a cable that has a tether end and a snare end. The snare end has an end stop and the tether end has a tether attachment to which a tether may be attached for holding the cable in position. A cam-lock slidingly engages the cable. The cam-lock has a first aperture and a second aperture through which the cable may pass to create a snare loop. The first aperture of the cam-lock has a locking mechanism to lock the first aperture onto the cable. A spring is provided that has a first arm and a second arm. The first arm and the second arm are biased towards an open orientation such that the spring in the open position appears sprung. Each of the first arm and the second arm having an eyelet for slidingly engaging the cable. A trigger is used to set and unset the spring. The trigger has a connection end that slidingly engages the first arm of the spring and a trigger tip. The trigger is movable between a set position and an unset position. In the set position, the trigger tip contacts the second arm of the spring and holds the spring in a closed position such that the first arm and the second arm are tensioned towards each other. In the unset position, the trigger tip does not contact the second arm of the spring. Movement to the unset position occurs when the snare loop is pulled causing a pull on the snare end of the cable. This causes the spring to be compressed such that the trigger tip is moved out of contact of the second arm. Movement from the set position to the unset position causes tightening of the snare loop.

In one embodiment, the trigger tip contacts the eyelet of the second arm of the spring.

In one embodiment, a washer slidingly engages the cable between the end of the second arm of the spring and the second aperture of the travelling loop. The washer is designed to prevent the second aperture of the travelling loop from interfering with the spring. The washer may also assist with compression of the spring when the trap is in the process of being sprung. The washer contacts the second arm of the spring and can assist in compression of the spring with the stop of the snare end of the cable. This causes the trigger to be released and the snare loop to tighten.

In one embodiment, the second aperture of the cam-lock is a breakaway device that releases the cable at a predetermined pressure. When breakaway device releases the cable, the snare loop is released and anything in the snare loop is released from the snare trap.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
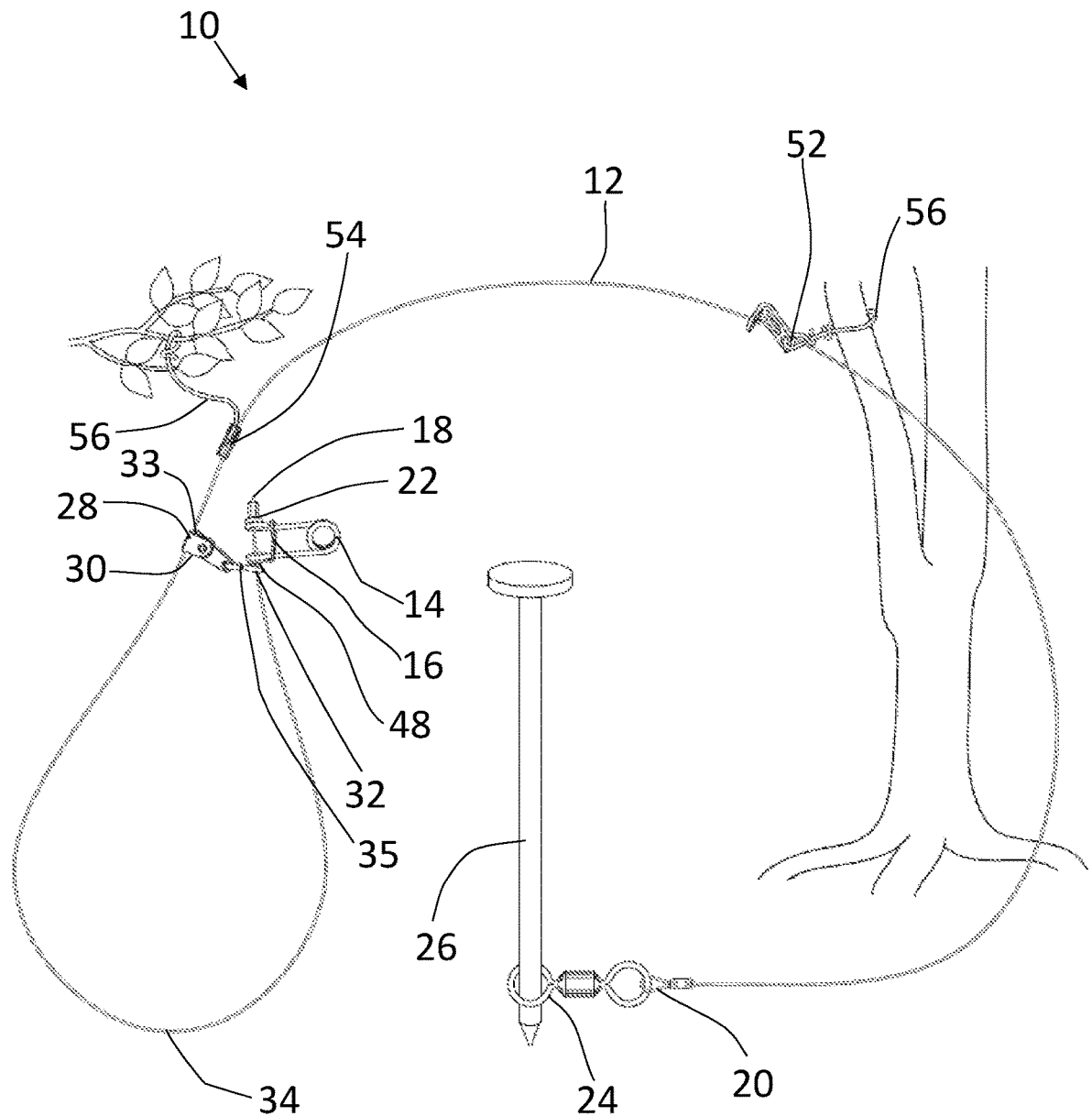
FIG. 1 is a perspective view of a set snare trap.

A snare trap, generally identified by reference numeral 10, will now be described with reference to FIG. 1 through FIG. 4.

Figure 2:
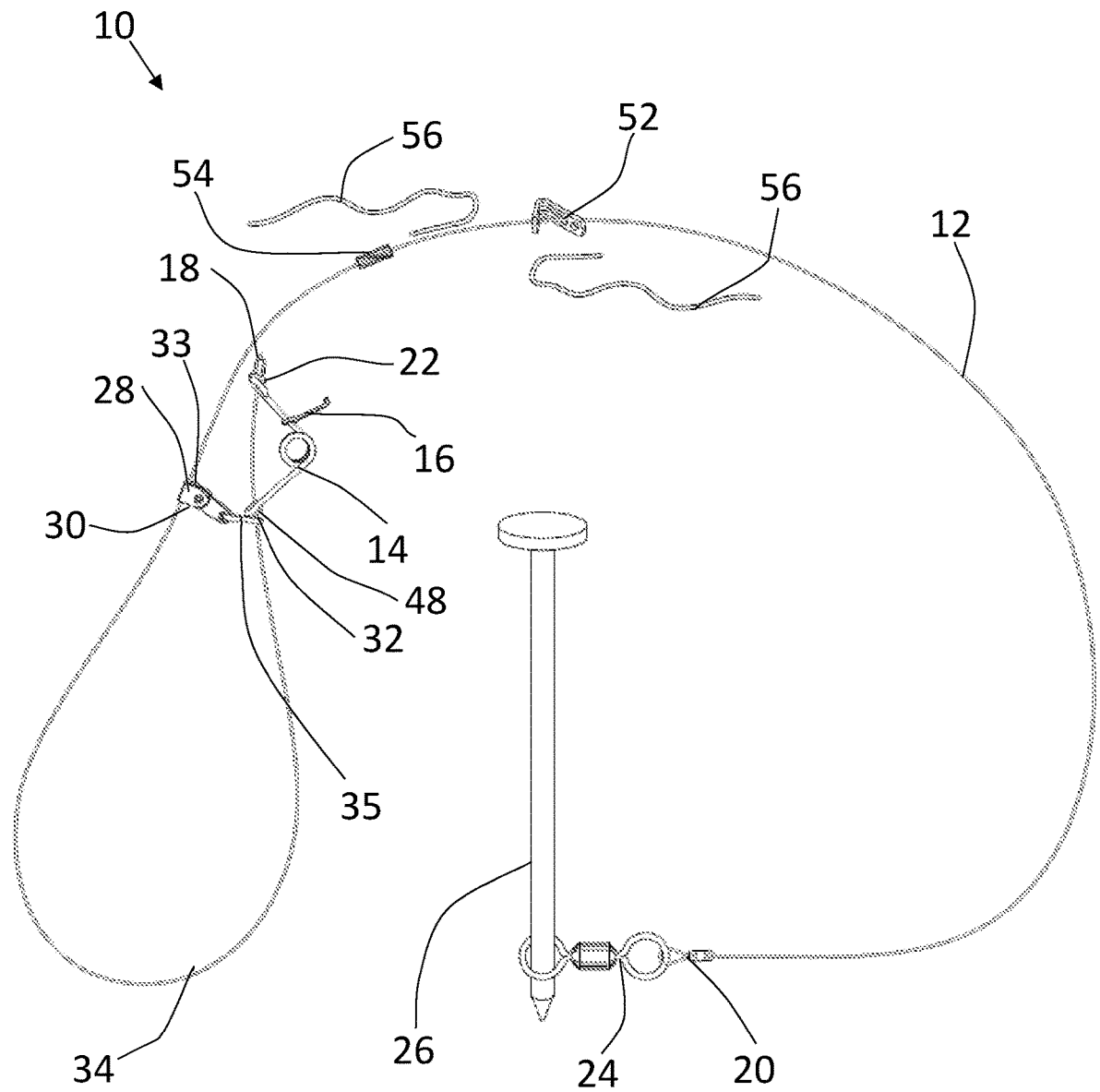
FIG. 2 is a perspective view of the snare trap after being tripped shown in FIG. 1.

Referring to FIG. 1 and FIG. 2, a snare trap 10 has a cable 12, a spring 14 and a trigger 16. Cable 12 has a snare end 18 with a stop 22 and a tether end 20 with a tether attachment 24 through which a tether 26, such as a spike, may pass or connect to hold snare trap 10 in position. Stop 22 prevents spring 14 from sliding off of snare end 18 of cable 12 and is also used during the release of trigger 16. A snare loop 34 is created using a travelling loop 28 which slidingly engages cable 12 with a first aperture 30 and a second aperture 32 through which cable 12 may pass. Snare loop 34 is created by second aperture 32 of travelling loop 28 slidingly engaging cable 12 such that second aperture 32 of traveling loop 28 and spring 14 are triggering mechanism 48 and spring 14 are outside of snare loop 34 and first aperture 30 slidingly engaging cable 12 at a distance from snare end 18 of cable 12 as determined by the user. First aperture 30 of travelling loop 28 has a locking mechanism 33 that allows first aperture to be locked onto cable 12 as snare loop begins to tighten and before trigger 16 is released. In the embodiment shown, first aperture 30 of travelling loop 28 is a cam-lock which includes a locking mechanism 33. Second aperture 32 of travelling loop 28 may incorporate a breakaway device 35 that releases cable 12 at a predetermined pressure. The predetermined pressure is determined by the type of breakaway device 35. When breakaway device 35 releases cable 12, snare loop 34 is released and anything trapped within snare loop 34 is released.

Figure 3:
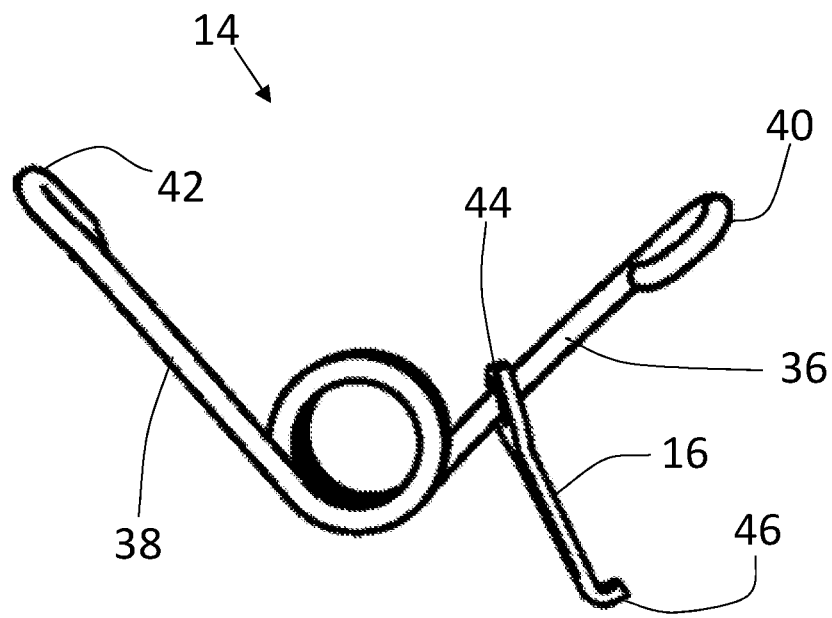
FIG. 3 is a side elevation view of the spring used in the snare trap shown in FIG. 1 in the sprung orientation.
Figure 4:
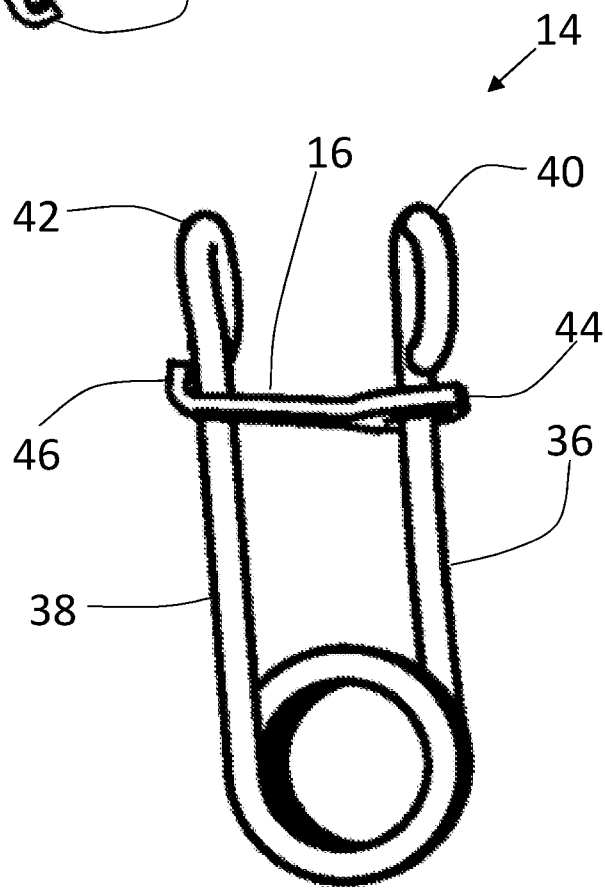
FIG. 4 is a side elevation view of the spring used in the snare trap shown in FIG. 1 in the set orientation.

Referring to FIG. 3, spring 14 has a first arm 36 and a second arm 38. First arm 36 and second arm 38 are biased towards an open orientation such that spring 14 in the open position appears sprung. Eyelets, or ends, 40 and 42, respectively, of first arm 36 and second arm 38 slidingly engage on cable 12. Trigger 16 has a connection end 44 and a trigger tip 46. Connection end 44 slidingly engages first arm 36 of spring 14. In the embodiment shown, connection end 44 is an eyelet that can slide up and down first arm 36 of spring. Trigger 16 is movable between a set position, shown in FIG. 4, and an unset position, shown in FIG. 3, Referring to FIG. 4, in the set position, trigger tip 46 contacts second arm 38 of spring 14 and holds spring 14 in a closed position such that first arm 36 and second arm 38 are tensioned towards each other. It is preferred that trigger tip 46 make contact with eyelet 42 of second arm 38 as this provides a consistent release pressure for snare trap 10. It will be understood that trigger tip 46 may make contact with any portion of second arm 38, however this may have an effect on the release pressure of snare trap 10, making it less consistent. Referring to FIG. 3, in the unset position, trigger tip 46 does not contact second arm 38 of spring 14 and spring 14 appears sprung.

Referring to FIG. 1, when an animal becomes ensnared within snare loop 34, the animal pulls on snare loop 34. This in turn causes snare end 18 of cable 12 and end stop 22 to be pulled towards first arm 36 of spring 14. End stop 22 contacts first arm 36 and causes compression of spring 14. Compression of spring 14 causes trigger tip 46 to slide out of contact with second arm 38 of spring 14, moving trigger 16 from the set position, shown in FIG. 4, to the unset position, shown in FIG. 3. This causes further tightening of snare loop 34. In the embodiment shown, a washer 48 is provided between second arm 38 of spring 14 and second aperture 32 of travelling loop 28. The main purpose of washer 48 is to prevent second aperture 32 of travelling loop 28 or breakaway device 35, when used, from interfering with spring 14. Washer 48 may also assist with compression of spring 14 when snare trap 10 is in the process of being sprung. Washer 48 contacts second arm 38 of spring 14 and causes compression of spring 14 with end stop 22 of snare end 18 of cable 12. This causes trigger 16 to be released and snare loop 34 to tighten.

In the embodiment shown in FIG. 1, triggering of snare trap 10 occurs when first aperture 30 of travelling loop 28, in this embodiment a cam-lock, slides down cable 12 to tighten snare loop 34. As snare loop 34 is tightened, pressure is applied to locking mechanism 33 of first aperture 30 to lock it onto cable 12. Once first aperture 30 is locked onto cable 12, further tightening of cable 12 causes snare end 18 of cable 12 and end stop 22 to be pulled towards spring 14. This causes spring 14 to be compressed and allows trigger tip 46 to be released from second arm 38 of spring 14. As spring 14 moves to the unset position, it causes snare loop 34 to be jerked tighter to quickly dispatch the animal in snare trap 10.

Referring to FIG. 1, a sliding cable lock 52 may be provided to allow for fine adjustments to be made to the timing of the trigger release. Timing of trigger release can be affected by the length of cable 12 between sliding cable lock 52 and snare end 18 of cable 12. In the embodiment shown, sliding cable lock 52 is attached to a tree branch using wire 56. It will be understood that sliding cable lock 52 may be attached to the trunk of a tree, a stake or any other available attachment as known in the art. A collar support 54 may also be used to position snare trap 10 and hold it in position. Collar support 54 slidingly engages cable 12 and can be tied to a tree, bush, stake or other type of tether to hold snare trap 10. In the embodiment shown, collar support 54 is slid over a piece of wire 56 and wire 56 is then attached to a tree branch. For proper functioning of snare trap 10, wire 56 should be breakable. Referring to FIG. 2, as an animal passes through snare loop 34, collar support 54 hold cable 12 and allows cam-lock to slide down cable 12 to tighten snare loop 34. After cam-lock has locked onto cable 12, collar support is released from wire 56 as a result of pulling by the animal. Sliding cable lock 52 continues to hold cable 12 short until spring 14 has been moved to the unset position. Sliding cable lock 52 may be released after spring 14 is moved to the unset position due to pulling by the animal.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A snare trap, comprising:
   a cable having a tether end and a snare end, the snare end having an end stop, the tether end having a tether attachment to which a tether is attachable for holding the cable in position, a travelling loop slidingly engaging the cable, the travelling loop having a first aperture and a second aperture through which the cable may pass to create a snare loop, the first aperture of the travelling loop having a locking mechanism to lock the first aperture onto the cable;
   a spring having a first arm and a second arm, the first arm and the second arm being biased towards an open orientation such that the spring in the open position appears sprung, an end of the first arm and an end of the second arm being slidingly engaged on the cable, the spring being positioned at the snare end of the cable between the end stop and the second aperture of the travelling loop, and the tether end of the cable being positioned at a distance from the spring; and
   a trigger, the trigger having a connection end and a trigger tip, the connection end slidingly engaging the first arm of the spring, the trigger being movable between a set position in which the trigger tip contacts the second arm of the spring and holds the spring in a closed position such that the first arm and the second arm are tensioned towards each other, and an unset position in which the trigger tip does not contact the second arm of the spring, movement to the unset position occurring when the snare loop is pulled causing a pull on the snare end of the cable and causing the spring to be compressed such that the trigger tip is moved out of contact of the second arm, movement from the set position to the unset position causing tightening of the snare loop.

2. The snare trap of claim 1 wherein the first aperture of the travelling loop is a cam-lock.

3. The snare trap of claim 1 wherein a washer slidingly engages the cable between the end of the second arm of the spring and the second aperture of the travelling loop.

4. The snare trap of claim 1 further comprising a tether for holding the snare trap in position.

5. The snare trap of claim 4 wherein the tether is a stake.

6. The snare trap of claim 1 further comprising a collar support for providing a means of anchoring the cable at a point between the tether end of the cable and the snare loop.

7. The snare trap of claim 1 wherein the second aperture of the travelling loop is a breakaway device that releases the cable at a predetermined pressure.

8. A snare trap, comprising:
   a cable having a tether end and a snare end, the snare end having an end stop, the tether end having a tether attachment to which a tether is attachable for holding the cable in position,
   a cam-lock slidingly engaging the cable, the cam-lock having a first aperture and a second aperture through which the cable may pass to create a snare loop, the first aperture of the cam-lock having a locking mechanism to lock the first aperture onto the cable;
   a spring having a first arm and a second arm, the first arm and the second arm being biased towards an open orientation such that the spring in the open position appears sprung, each of the first arm and the second arm having an eyelet for slidingly engaging on the cable, the spring being positioned at the snare end of the cable between the end stop and the second aperture of the travelling loop, the tether end of the cable being positioned at a distance from the spring; and
   a trigger, the trigger having a connection end and a trigger tip, the connection end slidingly engaging the first arm of the spring, the trigger being movable between a set position in which the trigger tip contacts the second arm of the spring and holds the spring in a closed position such that the first arm and the second arm are tensioned towards each other, and an unset position in which the trigger tip does not contact the second arm of the spring, movement to the unset position occurring when the snare loop is pulled causing a pull on the snare end of the cable and causing the spring to be compressed such that the trigger tip is moved out of contact of the second arm, movement from the set position to the unset position causing tightening of the snare loop.

9. The snare trap of claim 8 wherein the trigger tip contacts the eyelet of the second arm of the spring.

10. The snare trap of claim 8 wherein a washer slidingly engages the cable between the eyelet of the second arm of the spring and the second aperture of the cam-lock.

11. The snare trap of claim 8 wherein the second aperture of the cam-lock comprises a breakaway device that releases the cable at a predetermined pressure.

* * * * *